US009940073B1

(12) United States Patent
Thangapalam et al.

(10) Patent No.: US 9,940,073 B1
(45) Date of Patent: Apr. 10, 2018

(54) METHOD AND APPARATUS FOR AUTOMATED SELECTION OF A STORAGE GROUP FOR STORAGE TIERING

(71) Applicant: EMC IP Holding Company LLC, Hopkinton, MA (US)

(72) Inventors: Stalin Saravanakumar Thangapalam, Shrewsbury, MA (US); Katakam Gangadhar, Bangalore (IN); Santhosh Lakshmanan, Namakkal (IN); Selvamanickam Anbalagan, Madurai (IN); Anoop Ninan, Milford, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/319,797

(22) Filed: Jun. 30, 2014

(51) Int. Cl.
*G06F 3/06* (2006.01)
(52) U.S. Cl.
CPC .......... *G06F 3/0665* (2013.01); *G06F 3/0619* (2013.01); *G06F 3/0689* (2013.01)
(58) Field of Classification Search
None
See application file for complete search history.

(56) References Cited

U.S. PATENT DOCUMENTS

| | | | | |
|---|---|---|---|---|
| 6,088,764 A * | 7/2000 | Shyam | ................... | G06F 3/0614 711/112 |
| 8,682,955 B1 * | 3/2014 | Monden | ................. | G06Q 10/06 709/201 |
| 2003/0079019 A1 * | 4/2003 | Lolayekar | ........... | H04L 67/1097 709/226 |
| 2003/0149847 A1 * | 8/2003 | Shyam | ................... | G06F 3/0601 711/154 |
| 2004/0111485 A1 * | 6/2004 | Mimatsu | ................ | G06F 3/0605 709/213 |
| 2008/0177810 A1 * | 7/2008 | Devarakonda | .... | G06F 17/30221 |
| 2009/0112811 A1 * | 4/2009 | Oliveira | ................... | G06F 3/067 |
| 2013/0073914 A1 * | 3/2013 | Kaul | ................... | G06F 11/3048 714/49 |

OTHER PUBLICATIONS

MOcrosft dictionary p. 558, publish 2002.*

* cited by examiner

*Primary Examiner* — Duc Doan
(74) *Attorney, Agent, or Firm* — Daly, Crowley, Mofford & Durkee, LLP

(57) ABSTRACT

Example embodiments relate to methods, systems, and computer program products for creating a cascaded storage group. The method includes receiving a request to apply a data storage policy to a group of volumes; iterating through all available storage groups in a storage array to determine whether any volumes in a storage group satisfy a first condition of being both common to the group of volumes and not being associated with an existing cascaded storage group; defining a candidate list of those volumes in the storage group that satisfy the first condition; when iterating is complete, selecting as a child group to a parent cascaded storage group, volumes associated with the candidate list that satisfy a second condition; and selecting as a parent cascaded storage group, if the first and second candidate lists both satisfy the second condition, whichever of the first and second candidate lists was iterated through most recently.

22 Claims, 9 Drawing Sheets

METHOD AND APPARATUS FOR AUTOMATED SELECTION OF A STORAGE GROUP FOR STORAGE TIERING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

RELATED APPLICATIONS

This Application is related to U.S. patent application Ser. No. 13/630,455 entitled "SINGLE CONTROL PATH", Ser. No. 13/631,030 entitled "METHOD AND APPARATUS FOR FEDERATING A PLURALITY OF ONE BIG ARRAYS", Ser. No. 13/631,039 entitled "METHOD AND APPARATUS FOR AUTOMATED INFORMATION LIFE-CYCLE MANAGEMENT USING A FEDERATION OF ARRAYS", Ser. No. 13/631,055 entitled "METHOD AND APPARATUS FOR FEDERATED IDENTITY AND AUTHENTICATION SERVICES", Ser. No. 13/631,190 entitled "APPLICATION PROGRAMMING INTERFACE", Ser. No. 13/631,214 entitled "AUTOMATED POLICY BASED SCHEDULING AND PLACEMENT OF STORAGE RESOURCES" (now U.S. Pat. No. 9,417,797), and Ser. No. 13/631,246 entitled "DISTRIBUTED SYSTEM SOFTWARE INFRASTRUCTURE" filed on Sep. 28, 2012; Ser. No. 13/886,644 entitled "STORAGE PROVISIONING IN A DATA STORAGE ENVIRONMENT" (now U.S. Pat. No. 9,535,629), Ser. No. 13/886,786 entitled "DISTRIBUTED WORKFLOW MANAGER" (now U.S. Pat. No. 9,588,685), Ser. No. 13/886,789 entitled "PORT PROVISIONING SYSTEM", Ser. No. 13/886,892 entitled "SCALABLE INDEX STORE" (now U.S. Pat. No. 9,233,517), Ser. No. 13/886,687 entitled "STORAGE PROVISIONING IN A DATA STORAGE ENVIRONMENT" (now U.S. Pat. No. 9,658,797), and Ser. No. 13/886,915 entitled "SCALABLE OBJECT STORE" (now U.S. Pat. No. 9,558,194) filed on May 3, 2013; and Ser. No. 14/319,757 entitled "METHOD AND APPARATUS FOR AUTOMATED MULTI SITE PROTECTION AND RECOVERY FOR CLOUD STORAGE" (now U.S. Pat. No. 9,612,769); Ser. No. 14/319,757 entitled "GLOBAL STORAGE RESOURCE MANAGEMENT" (now U.S. Pat. No. 9,612,769); Ser. No. 14/319,772 entitled "METHOD AND APPARATUS FOR AUTOMATED ORCHESTRATION OF LONG DISTANCE PROTECTION OF VIRTUALIZED STORAGE"; Ser. No. 14/319,777 entitled "METHOD AND APPARATUS FOR HIGHLY AVAILABLE STORAGE MANAGEMENT USING STORAGE PROVIDERS"; Ser. No. 14/319,804 entitled "METHOD AND APPARATUS FOR STORAGE MANAGEMENT USING VIRTUAL STORAGE ARRAYS AND VIRTUAL STORAGE POOLS", and Ser. No. 14/313,104 entitled "STORAGE PORT ALLOCATION BASED ON INITIATOR USAGE" filed on even date herewith, which are hereby incorporated herein by reference in their entirety.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

Storage arrays are typically used to provide storage space for one or more computer file systems, databases, applications, and the like. For this and other reasons, it is common for storage arrays to be logically partitioned into chunks of storage space, called logical units, or LUs. A logical unit may be a logical entity provided by a storage system for accessing data stored in the storage system. In particular, to enable initiators to send requests to a data storage system, the data storage system exposes one or more LUs to which commands are issued. A logical unit number (LUN) may be a logical unit number for identifying a logical unit. A logical unit also may be referred to herein interchangeably as a logical volume or a logical device. This allows a unified storage array to appear as a collection of separate file systems, network drives, and/or Logical Units. The Storage Array keeps track of the logical unit to physical unit association in a map. The map associates a host logical unit address with a physical device address. A LUN may be a logical unit number which is an identifier for a Logical Unit. Summary Example embodiments of the present invention relate to a method, a system, and a computer program product for creating a cascaded storage group. The method includes receiving a request to group a first set of logical units (LUs) (also referred to herein as logical volumes or logical devices, as discussed below) in a new storage group and determining whether a second set of LUs/logical volumes grouped in an existing storage group is a subset of the first set of LUs/logical volumes. The method also includes creating a cascaded storage group according to the determination.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
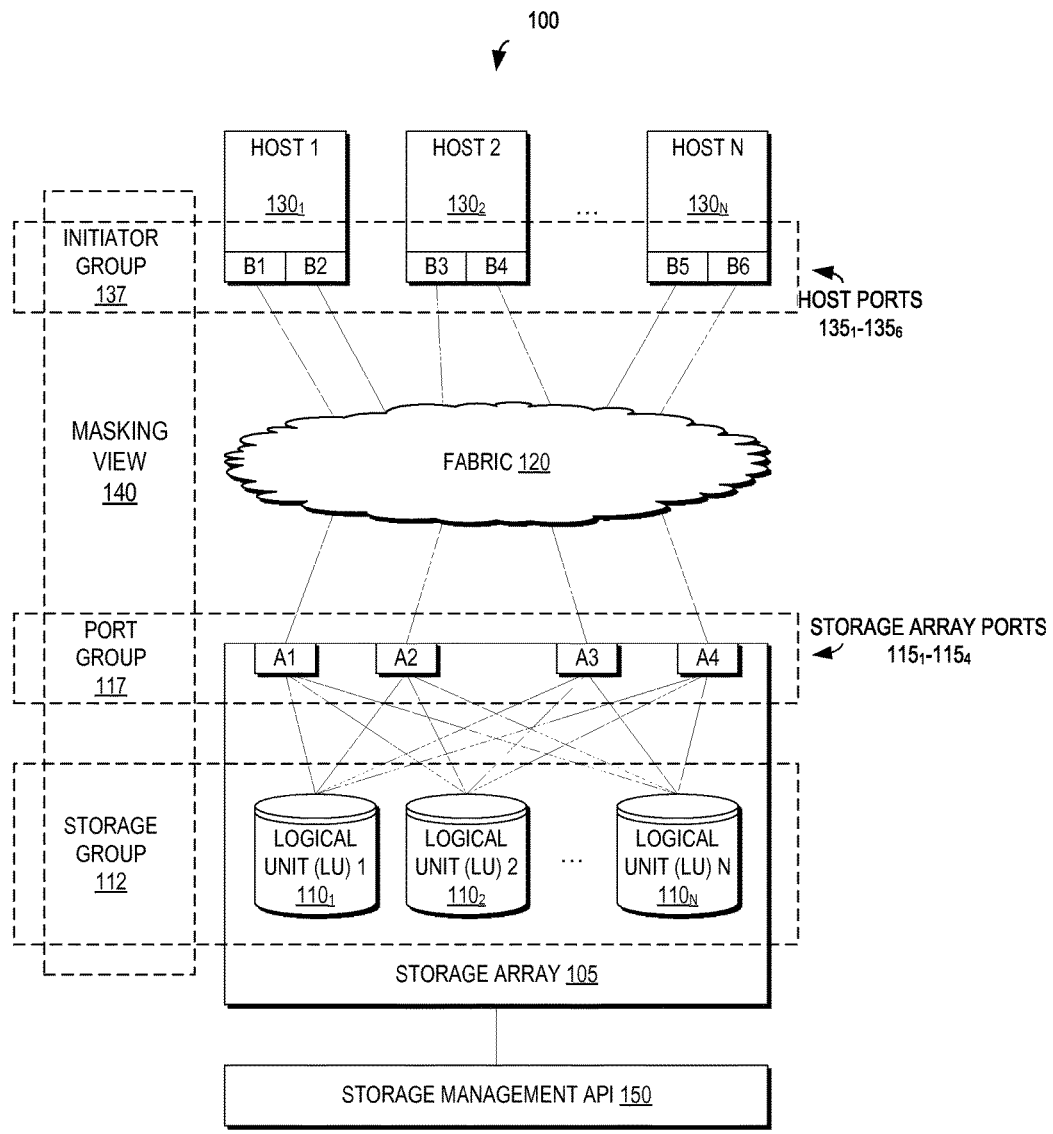
FIG. 1 is a block diagram of a system including a storage group according to an example embodiment of the present invention.

Computer systems may include different resources used by one or more host processors. Resources and host processors in a computer system may be interconnected by one or more communication connections. These resources may include, for example, data storage devices such as those included in the data storage systems manufactured by EMC Corporation of Hopkinton, Mass. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations. Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units or logical devices (also referred to interchangeably herein as a plurality of logical volumes). Different sections of the logical volumes may or may not correspond to the actual disk drives. The logical disk units/logical units/logical volumes may or may not correspond to the actual disk drives. Allowing multiple host systems to access the single storage device unit allows the host systems to share data stored therein.

Two components having connectivity to one another, such as a host and a data storage system, may communicate using a communication connection. In one arrangement, the data storage system and the host may reside at the same physical site or location. Techniques exist for providing a remote mirror or copy of a device of the local data storage system so that a copy of data from one or more devices of the local data storage system may be stored on a second remote data storage system. Such remote copies of data may be desired so that, in the event of a disaster or other event causing the local data storage system to be unavailable, operations may continue using the remote mirror or copy.

In another arrangement, the host may communicate with a virtualized storage pool of one or more data storage systems. In this arrangement, the host may issue a command, for example, to write to a device of the virtualized storage pool. In some existing systems, processing may be performed by a front end component of a first data storage system of the pool to further forward or direct the command to another data storage system of the pool. Such processing may be performed when the receiving first data storage system does not include the device to which the command is directed. The first data storage system may direct the command to another data storage system of the pool which includes the device. The front end component may be a host adapter of the first receiving data storage system which receives commands from the host. In such arrangements, the front end component of the first data storage system may become a bottleneck in that the front end component processes commands directed to devices of the first data storage system and, additionally, performs processing for forwarding commands to other data storage systems of the pool as just described.

Often cloud computing may be performed with a data storage system. As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation," a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers.

Fully automated storage tiering (FAST) is a technology that provides for the automated storage and movement of data according to characteristics of the data, such as frequency of use, time of last use of the data, and/or user information associated with the data, among other characteristics. Data may be automatically moved between different storage areas or tiers periodically and/or after a trigger event according to various policies based on the data characteristics, for example. A FAST system may operate in connection with thin or virtual provisional technologies in which a storage system presents a large amount of storage capacity to a host, but consumes space only as needed from a shared pool. With thin provisioning, the host visible capacity (e.g., storage perceived by the applications) may be larger than the actual allocated space on the storage system.

Co-owned application Ser. No. 12/494,622 (now U.S. Pat. No. 9,274,941) and Ser. No. 12/639,469469 (now U.S. Pat. No. 8,549,224) titled "FACILITATING DATA MIGRATION BETWEEN TIERS" and "LOGICAL UNIT MIGRATION ASSISTANT FOR HARDWARE-BASED STORAGE TIERING," respectively, provide a description of Fully Automated Storage Tiering (FAST), by EMC Corporation of Hopkinton, Mass., and are hereby incorporated by reference. For discussions of various automated storage tiering systems, including the use of thin provisioning, see, for example, U.S. Patent App. Pub. No. 2009-0070541 to Yochai, entitled "Automated information life-cycle management with thin provisioning" and U.S. Pat. No. 7,822,939 to Veprinsky, et al., entitled "Data de-duplication using thin provisioning," which are both incorporated herein by reference. Veprinsky, for example, describes an automated storage tiering system with thin provisioning that can operate, in certain embodiments, with only one logical volume that can map to physical storage space on a physical volume, where the physical storage space can be on a physical storage area (disk drives, tape, solid state storage, etc.) that may include multiple tiers of storage in which each tier of storage areas and/or disk drives that may be ordered according to different characteristics and/or classes, such as speed, technology and/or cost.

Additionally, cloud computing technologies may provide for the use of online compute and storage services to execute applications in a virtual environment and in which resources may be efficiently allocated to provide on-demand compute and storage capacity over a network infrastructure. For discussions of systems and techniques for online services to provide on-demand data storage functions, see, for example, U.S. Pat. No. 7,836,018, entitled "Simultaneously accessing file objects through web services and file services;" and US Patent App. Pub. Nos. 2009-0112811 entitled "Exposing Storage Resources with Differing Capabilities;" 2009-0112921 entitled "Managing Files Using Layout Storage Objects;" 2009-0112880 entitled "Managing File Objects in a Data Storage System;" and 2009-0112789 entitled "Policy Based File Management," all to Oliveira, et al. and which are all hereby incorporated by reference.

Traditional solutions to apply FAST to storage array volumes, such as those in SYMMETRIX® VMAX® arrays, by EMC Corporation of Hopkinton, Mass., may involve lots of planning and complicated document procedures which typically are executed only by experienced IT professionals. VMAX FAST, by itself, includes numerous restrictions, including: FAST cannot be applied on volumes rather on Storage Groups (SG); a Fast Volume cannot belong to more than one SG; and a child SG cannot be associated with multiple parent SGs (policy associated with SG, cannot have multiple policies associated with volume).

Typically, control of and provisioning of multiple data services for heterogeneous storage systems may be problematic. Conventionally, some systems may have only enabled provisioning of homogenous storage systems. Generally, controlling provisioning of heterogeneous storage with a single control path may not have been possible. Conventionally, providing different types of data services through a single control path may not have been possible.

In certain embodiments, the current disclosure may enable a distributed software control platform that allows enterprise IT departments and cloud service providers to convert the heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multitenant environments that delivers a single logical, cloud-scale, goo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as one large storage array. In further embodiments, the current disclosure may enable one big array to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through the Bourne software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMware® and OpenStack™.

In certain embodiments, the following definitions may be useful:

A data service may be a service for receiving, processing, storing, and protecting data. In certain embodiments, data services provide the high-level data and storage management capabilities of the system.

A control path may be a way to establish and control access to the data.

A data path may be the path the data takes.

A storage medium may be any medium that is capable of storing data, including, but not limited to a storage array, a storage cluster, a physical disk, a virtual disk, and a virtual storage system.

A tenant may represent an organization operating within a one big array. In some embodiments, a tenant may be created in the system for the purposes of security isolation.

A project may be a resource organization abstraction that maps resources to applications, virtual data centers, departments, or other entities meaningful to the user. In some embodiments, a user may create their own projects, and may associate multiple resources from different services with them. In most embodiments, resources from one project maybe shared between users under the same tenant.

Generally, a data storage array or system may be one or more physical boxes or a cluster of physical boxes. In conventional systems, the data storage array or system may have one control path and some number of data paths. In typical systems, one or more data path ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system.

Conventionally, the data storage system or array may be a cluster of storage mediums. Typically, providing management for large numbers of data storage arrays or systems may be challenging.

Cloud environments can provide fully automated storage tiering (FAST) support for managed service storage. In general, while having some high level similarities, different storage array types provide varying mechanisms and models to support FAST.

It is known that conventional datacenters are typically populated with systems of many types, from various vendors, which often have different methods and processes to achieve the same functionality. For example, most storage systems implement a method of expanding a storage volume, but each vendor has their own differently branded-name for the feature, with procedures that are different enough so as to require datacenter technicians to know the different procedures for each one. And sometimes a vendor will have more than one model of storage system, each with varying implementations of the same feature, so that using a single vendor does not overcome this issue.

Currently available storage array often have what is referred to as "automated storage tiering." The way in which this feature is implemented on different arrays varies, while producing similar results. The internal model used to represent the array entities varies, as do the commands used to configure the feature. So, one array may have tiering 'policies' that contain 'tiers' each of which includes a collection of multiple storage pools, while another may have multiple tiers within a single pool. Such fundamental differences in the way the array represents and implements this feature end up requiring larger IT staff, more training, and more chances to confuse arrays and mis-configure a system.

Fully Automated Storage Tiering (FAST), which can be provided for virtual pools (VP), for example, increases performance by intelligently managing data placement at a sub-LUN level. When FAST is implemented, the storage system measures, analyzes, and implements a dynamic storage-tiering policy much faster and more efficiently than an administrator could ever achieve.

Storage tiering puts drives of varying performance levels and cost into a storage pool. LUNs use the storage capacity they need from the pool, on the devices with the required performance characteristics. The relative activity level of each slice is used to determine which slices should be promoted to higher tiers of storage. Relocation is initiated at the user's discretion through either manual initiation or an automated scheduler.

As data progresses through its life cycle, it experiences varying levels of activity. When data is created, it is typically heavily used. As it ages, it is accessed less often. This is often referred to as being temporal in nature.

In an exemplary embodiment, a FAST system segregates disk drives into the following tiers:
  extreme performance tier—e.g., flash drives;
  performance tier—e.g., serial attach SCSI (SAS) drives and Fibre Channel (FC) drives; and
  capacity Tier—e.g., Near-Line SAS (NL-SAS) drives and SATA drives Flash drives are built on solid-state drive (SSD) technology with no moving parts. The absence of moving parts makes these drives highly energy-efficient, and eliminates rotational latencies. Therefore, migrating data from spinning disks to Flash drives can boost performance and create significant energy savings. Adding a small (e.g., single-digit) percentage of Flash capacity to storage, while using intelligent tiering can deliver double-digit percentage gains in throughput and response time performance in some applications.

Traditional spinning drives offer high levels of performance, reliability, and capacity. These drives are based on mechanical hard-drive technology that stores digital data on a series of rapidly rotating magnetic platters, e.g., 10 k and 15 k rpm spinning drives.

Using capacity drives can significantly reduce energy use and free up more expensive, higher-performance capacity in higher storage tiers. In some environments, 60 percent to 80 percent of the capacity of many applications has little I/O activity. Capacity drives can cost about four times less than performance drives on a per-gigabyte basis, and a small fraction of the cost of Flash drives. They consume up to 96 percent less power per TB than performance drives. Capacity drives have a slower rotational speed than Performance Tier drives, e.g., 7.2 k rotational speed.

In general, FAST systems operate by periodically relocating the most active data up to the highest available tier to ensure sufficient space in the higher tiers FAST relocates less active data to lower tiers. In an exemplary embodiment, each 1 GB block of data is referred to as a "slice." When FAST relocates data, it will move the entire slice to a different storage tier.

Heterogeneous storage pools are the framework that allows FAST to fully utilize each of the storage tiers discussed. Heterogeneous pools are made up of more than one type of drive. LUNs can then be created at the pool level. These pool LUNs are not bound to a single storage tier, instead, they can be spread across different storage tiers within the same pool.

In an exemplary embodiment, LUNs must reside in a pool to be eligible for FAST relocation. Pools support thick LUNs and thin LUNs. Thick LUNs are high-performing LUNs that use contiguous logical block addressing on the physical capacity assigned from the pool. Thin LUNs use a capacity-on-demand model for allocating drive capacity. Thin LUN capacity usage is tracked at a finer granularity than thick LUNs to maximize capacity optimizations. FAST is supported on both thick LUNs and thin LUNs.

In general, FAST systems uses a series of strategies to identify and move the correct slices to the desired tiers: statistics collection, analysis, and relocation.

In one aspect of statistics collection, a slice of data is considered hotter (more activity) or colder (less activity) than another slice of data based on the relative activity level of the two slices. Activity level is determined by counting the number of I/Os for each slice. FAST maintains a cumulative I/O count and "weights" each I/O by how recently it arrived. This weighting decays over time. New I/O is given full weight. After approximately 24 hours, for example, the same I/O carries about half-weight. After a week. the same I/O carries little weight. Statistics are continuously collected (as a background task) for all pool LUNs.

As part of the analysis process, once per hour, for example, the collected data is analyzed to produce a rank ordering of each slice within the pool. The ranking progresses from the hottest slices to the coldest slices relative to the other slices in the same pool. (For this reason, a hot slice in one pool may be comparable to a cold slice in another pool.) There is no system-level threshold for activity level. The most recent analysis before a relocation determines where slices are relocated.

During user-defined relocation windows, 1 GB slices are promoted according to both the rank ordering performed in the analysis stage and a tiering policy set by the user. During relocation, FAST relocates higher-priority slices to higher tiers; slices are relocated to lower tiers only if the space they occupy is required for a higher-priority slice. This way, FAST fully utilizes the highest-performing spindles first. Lower-tier spindles are utilized as capacity demand grows. Relocation can be initiated manually or by a user-configurable, automated scheduler.

The relocation process targets to create ten percent free capacity, for example, in the highest tiers in the pool. Free capacity in these tiers is used for new slice allocations of high priority LUNs between relocations.

FAST properties can be viewed and managed at the pool level. Tiering information T1, T2, T3 can be provided for a specific pool. A tier status section of a window shows FAST relocation information specific to the pool selected. Scheduled relocation can be selected at the pool level from a drop-down menu labeled Auto-Tiering. This can be set to either Scheduled or Manual. Users can also connect to an array-wide relocation schedule. A Data Relocation Status can display what state the pool is in with regards to FAST. A ready state can indicate that relocation can begin on this pool at any time. The amount of data bound for a lower tier can be shown next to Data to Move Down, and the amount of data bound for a higher tier can be listed next to Data to Move Up. Below that can be the estimated time required to migrate all data within the pool to the appropriate tier.

In an exemplary embodiment, there are four tiering policies available within FAST:

Auto-tier
Highest available tier
Lowest available tier
No data movement

In one embodiment, auto-tier is the default setting for pool LUNs upon their creation. FAST relocates slices of these LUNs based on their activity level. Slices belonging to LUNs with the auto-tier policy have second priority for capacity in the highest tier in the pool after LUNs set to the highest tier.

The highest available tier setting should be selected for those LUNs which, although not always the most active, require high levels of performance whenever they are accessed. FAST will prioritize slices of a LUN with highest available tier selected above all other settings. Slices of LUNs set to highest tier are rank ordered with each other according to activity. Therefore, in cases where the sum total of LUN capacity set to highest tier is greater than the capacity of the pool's highest tier, the busiest slices occupy that capacity.

The lowest available tier should be selected for LUNs that are not performance or response-time-sensitive. FAST maintains slices of these LUNs on the lowest storage tier available regardless of activity level.

No data movement may only be selected after a LUN has been created. FAST will not move slices from their current positions once the no data movements election has been made. Statistics are still collected on these slices for use if and when the tiering policy is changed.

The tiering policy chosen also affects the initial placement of a LUN's slices within the available tiers. Initial placement with the pool set to auto-tier will result in the data being distributed across all storage tiers available within the pool. The distribution is based on available capacity in the pool. If, for example, 70 percent of a pool's free capacity resides in the lowest tier, then 70 percent of the new slices will be placed in that tier.

LUNs set to highest available tier will have their component slices placed on the highest tier that has capacity available. LUNs set to lowest available tier will have their component slices placed on the lowest tier that has capacity available.

LUNs with the tiering policy set to no data movement will use the initial placement policy of the setting preceding the change to no data movement. For example, a LUN that was previously set to highest tier but is currently set to no data movement will still take its initial allocations from the highest tier possible.

When a pool includes LUNs with stringent response time demands, users may set all LUNs in the pool to highest available tier. That way, new LUN slices are allocated from the highest tier. Since new data is often the most heavily used, this provides the best performance for those slices. At the same time, if all LUNs in the pool are set to highest tier, slices are relocated based on their relative activity to one another.

The highest available tier policy can be used for large scale migrations into a pool. When the migration process is started, it is best to fill the highest tiers of the pool first. Using the auto-tier setting would place some data in the capacity tier. At this point, FAST has not yet run an analysis on the new data so it cannot distinguish between hot and cold data. Therefore, with the auto-tier setting, some of the busiest data may be placed in the capacity tier. In these cases, the target pool LUNs can be set to highest tier. That way, all data is initially allocated to the highest tiers in the pool. As the higher tiers fill and capacity from the capacity (NL-SAS) tier starts to be allocated, the migration can be stopped to run a manual relocation. Assuming an analysis has had sufficient time to run, relocation will rank order the slices and move data appropriately. In addition, since the relocation will attempt to free ten percent of the highest tiers, there is more capacity for new slice allocations in those tiers.

In one aspect of the invention, an array agnostic FAST support mechanism is provided for applying FAST policies to managed service storage in array agnostic manner. The FAST policies cover storage having a variety of types. The storage detail is abstracted for the user to enable the user to select a policy without needing to understand the underlying mechanisms and models of the storage types. The user can rely on managed services to consume storage from FAST associated LUNs, regardless of the underlying array or array mechanisms.

In another aspect of the invention, a cloud storage environment supports auto-tiering in non-tiering supported arrays. As described above, auto tiering provides more control and flexibility to users in placing the portions of LUN on specific tiers, based on their usage pattern. Exemplary tiering policies include:
DEFAULT_HIGHEST_AVAILABLE,
DEFAULT_LOWEST_AVAILABLE,
DEFAULT_AUTO_TIER,
NO_DATAMOVEMENT In a cloud storage environment, it is desirable to have an automated solution starting from selection of a pool to volume creation, and assignment of a Fast policy to the created volume.

Exemplary embodiments of the invention provide a framework for auto tiering implementation in a cloud storage environment. In general, a virtual storage tier is modeled with storage pools carved out of multiple disk types with tiering policies created on the arrays. Mixed storage pools are detected and modeled with each disk type as a virtual tier. This allows a user to select a tiering policy from system defined policies on the array as part of a Virtual Pool (class of Service). In exemplary embodiments, storage pools are auto selected at the time of provisioning using an automated ranking mechanism based on utilization percentages of the virtual storage tiers and the tiering policy provided in the Virtual Pool (CoS). Automated assignment of tiering policies to storage volumes placed in the selected storage pool can be provided. This arrangement provides optimal distribution of volume extents across virtual tiers in the Array.

In auto discovery cycles, the system collects data on storage pools and the list of disk types, from which the pool is carved out. Each disk type is modeled as a virtual tier, which includes data on the underlying disk technology used, percentage of volume data placed in each disk type, which is referred as percentage utilized. In general, a storage pool can include multiple virtual tiers. The class of service is used as an interface to include the virtual tier type and the Fast policy selected by the user.

In an exemplary embodiment, the system runs an automated pool selection process that trims out the pools which do not have enough space to accommodate the volume. From the remaining pools, the system trims out storage pools that do not have the selected drive type as one of their virtual tiers. A ranking mechanism then identifies the match for storage pool.

FIG. 1 is a block diagram of a system including a storage group according to an example embodiment of the present invention. As illustrated in FIG. 1, the system 100 may include a storage array 105 having a plurality of logical units (LUs) $110_1$-$110_N$ (110 generally), also referred to herein as logical volumes, available over a plurality of storage array ports A1-A4 $115_1$-$115_4$ (115 generally). In certain embodiments, as illustrated in FIG. 1, each logical volume/LU 110 is available over each port 115; however, in certain embodiments, particular LUs/logical volumes 110 may only be made available over particular ports 115.

The storage array ports 115 may be connected via a network fabric 120 to a plurality of hosts 1-N $130_1$-$130_N$ (130 generally) via respective host ports $135_1$-$135_6$ (135 generally). The connections via the network fabric 120 may provide multipathing capabilities for the hosts 130. A multipathing software is a host server based software that is used to read data from and write data to storage arrays via the multiple paths between host server and storage array. In a typical deployment, an application (not shown) running on the host 125 issues I/O requests (e.g., read, write, and control commands) to the storage array 105. The multipathing software selects one of the paths for transmitting each I/O request to the storage array 105. In general, multiple paths are available to provide redundancy and the multipathing software selects the most viable path for each request by considering, for example, load sharing and failover. An example of path management software is EMC® POWERPATH® by EMC Corporation of Hopkinton, Mass.

The plurality of host ports 135 may be bundled in an initiator group 137 and the plurality of storage array ports 115 may be bundled in a port group 117. Further, the plurality of LUs/logical volumes 110 may belong to a storage group 112. A masking view 140 may mask the underlying ports and connectivity from the hosts 130 to the LUs/logical volumes 110 to provide what appears to the host as direct access to the LUs/logical volumes 110 on the storage array 105.

Figure 2:
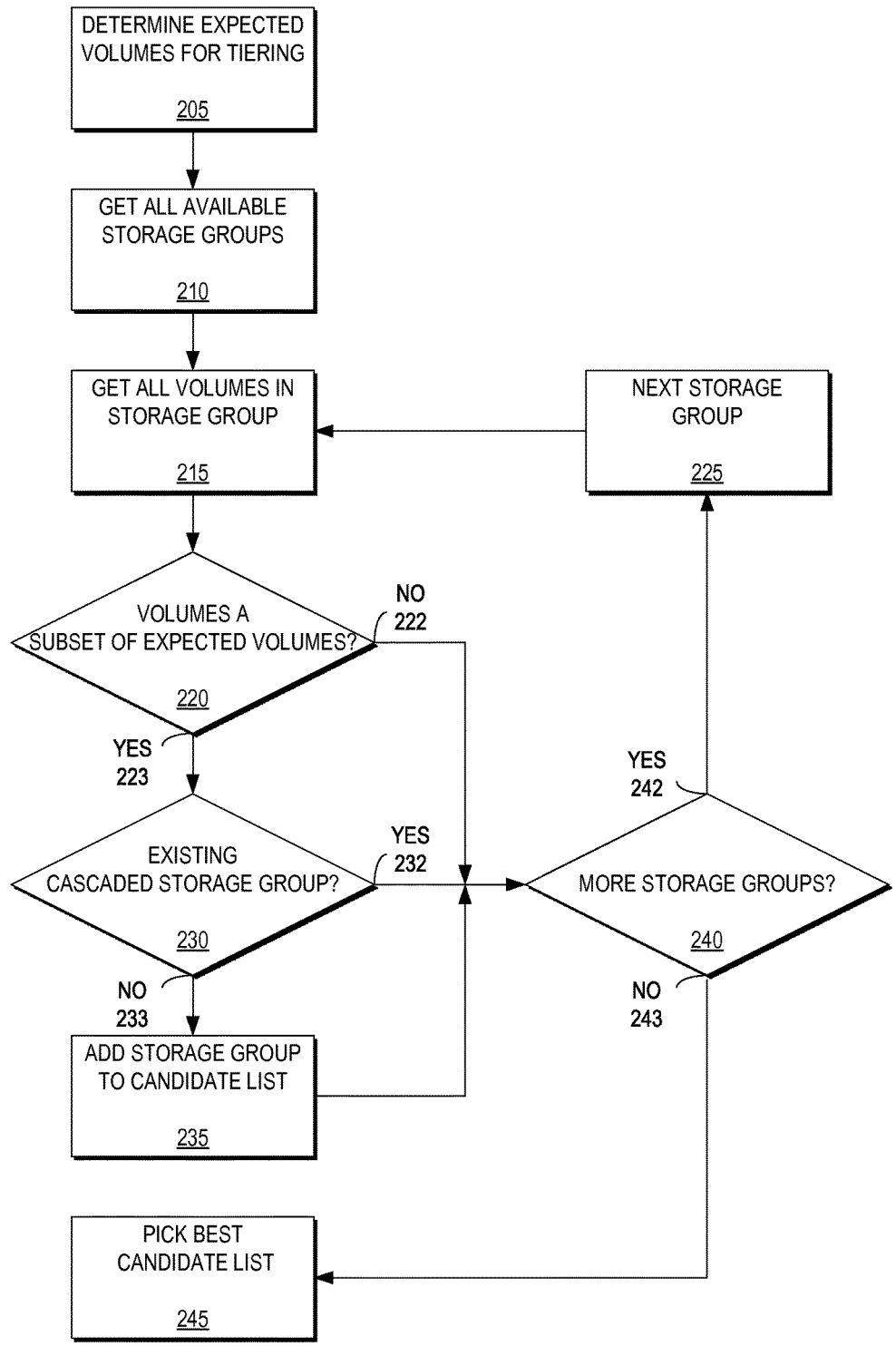
FIG. 2 is a flow diagram of a method of determining candidate existing storage groups in creating a cascaded storage group according to an example embodiment of the present invention.

FIG. 2 is a flow diagram of a method of determining candidate existing storage groups in creating a cascaded storage group according to an example embodiment of the present invention. A storage management API may be used to determine the optimal storage group for volumes to which FAST may be applied. In a preferred embodiment, the storage management API has visibility in the storage groups, and the volumes contained there, of the underlying datacenter.

As illustrated in FIG. 2, the storage management API (e.g., storage management API 150 of FIG. 1) may determine expected volumes for tiering (205). In other words, the storage management API may receive a request to apply a FAST policy to a group of volumes (i.e., the expected volumes). The storage management API then may determine all available storage groups on the storage array (210). The storage management API then may iterate of each of the storage groups and, for each storage group, determine all the volumes in the storage group (215).

The storage management API then may determine whether the volumes in the storage group (from step 215) are a subset of the expected volumes (220). If the volumes in the storage group (from step 215) are not a subset of the expected volumes (222) the storage management API may determine if there are more storage groups (240). If there are more storage groups (242), the storage management API may iterate to the next storage group (225) and determine all the volumes in the next storage group. However, if there are no more storage groups (243), and there are no candidates in the candidate list, the method fails and a cascaded storage group cannot be created. If there are candidates in the candidate list, the storage management API may then pick the best candidate from the candidate list (245) as described in greater detail below.

If the volumes in the storage group are a subset of the expected volumes (223), the storage management API may determine whether the storage group is an existing cascaded storage group (230). A cascaded storage group is a storage group that can have any number of child storage groups, with each child storage group capable of having a different FAST policy assigned to it. However, it should be noted that two FAST policies cannot be applied to the same parent cascaded storage group. If the storage group is an existing cascaded storage group (232), the storage management API may determine whether there are more storage groups (240). If there are more storage groups (242), the storage management API may iterate to the next storage group (225) and determine all the volumes in the next storage group. However, if there are no more storage groups (243), and there are no candidates in the candidate list, the method fails and a cascaded storage group cannot be created. If there are candidates in the candidate list, the storage management API may then pick the best candidate from the candidate list (245) as described in greater detail below.

If the storage group is not an existing cascaded storage group (233), then the storage management API may add the storage group to a candidate list of potential storage groups to be used as child storage groups in creating a parent cascaded storage group (235). The storage management API then may determine whether there are more storage groups (240). If there are more storage groups (242), the storage management API may iterate to the next storage group (225) and determine all the volumes in the next storage group. However, if there are no more storage groups (243), and there are no candidates in the candidate list, the method fails and a cascaded storage group cannot be created. If there are candidates in the candidate list, the storage management API may then pick the best candidate from the candidate list (245).

Figure 3:
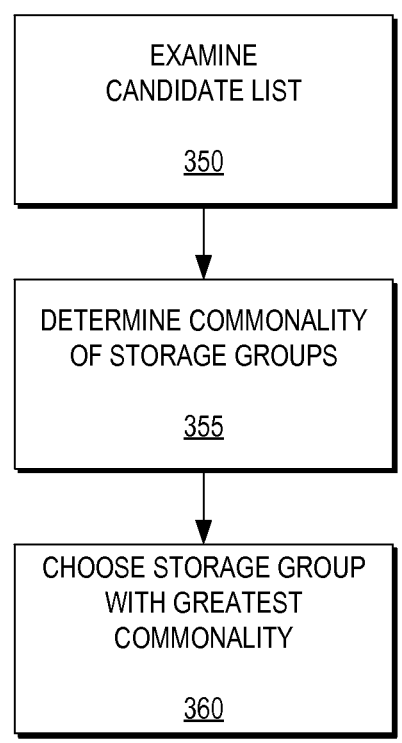
FIG. 3 is a flow diagram of a method of picking a candidate existing storage group as a child storage group in creating a cascaded storage group according to an example embodiment of the present invention.

FIG. 3 is a flow diagram of a method of picking a candidate existing storage group as a child storage group in creating a cascaded storage group according to an example embodiment of the present invention. As illustrated in FIG. 3, the storage management API may examine the candidate list (350) and determine whether there is commonality between any of the candidate storage groups (355). If there is commonality between any of the storage groups, the storage management API may then choose the storage group among those storage groups with commonality having the greatest commonality with the expected volumes (360). This existing storage group then may be selected as a child storage group for inclusion in the parent cascaded storage group, and the FAST policy then may be applied to the child storage groups.

FIGS. 4A-7B are block diagrams of existing storage groups and cascaded storage groups created therefrom, respectively, according to example embodiments of the present invention. The examples illustrated in FIGS. 4A-7B are intended only to demonstrate creation of parent cascaded storage groups and are not intended to be limiting.

Figure 4B:
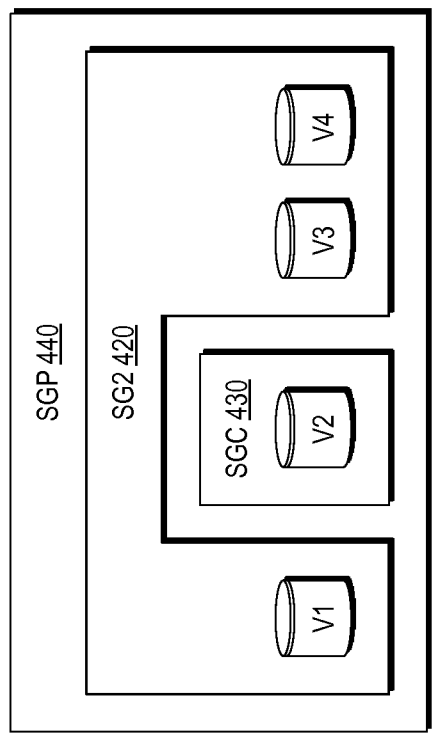
FIGS. 4A-7B are block diagrams of existing storage groups and cascaded storage groups created therefrom, respectively, according to example embodiments of the present invention.
Figure 4A:
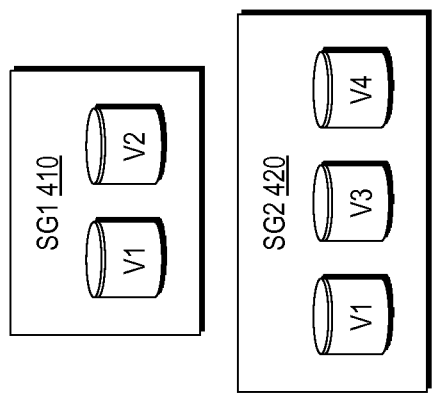

FIGS. 4A and 4B are block diagrams illustrating creation of a parent cascaded storage group having volumes V1, V2, V3, and V4. As illustrated in FIG. 4A, there are two existing storage groups, SG1 410 having volumes V1 and V2 and SG2 420 having volumes V1, V3, and V4. The storage management API may use the method illustrated in the flow diagram of FIG. 2 to determine whether either and which existing storage group (i.e., SG1 410 and/or SG2 420) may be used as a child storage group in creating a cascaded parent storage group.

Accordingly, the storage management API may determine the expected volumes for tiering (e.g., volumes V1, V2, V3, and V4) (205). The storage management API then may get all available storage groups (e.g., SG1 410 and SG2 420) (210). The storage management API the may get all volumes in a storage group (e.g., V1 and V2 in SG1 410) (215) and determine whether the volumes are a subset of the expected volumes (220). In this example, volumes V1 and V2 in SG1 410 are a subset of the expected volumes V1, V2, V3, and V4 (223) and are not an existing cascaded storage group (233). Accordingly, the storage management API may add storage group SG1 410 to a candidate list (235) and determine whether there are more storage groups (240).

The storage management API then may iterate to the next storage group (225) SG2 420 and get all volumes in the storage group (e.g., V1, V3, and V4 in SG2 420) (215). In this example, volumes V1, V3 and V4 in SG2 420 are a subset of the expected volumes V1, V2, V3, and V4 (223) and are not an existing cascaded storage group (233). Accordingly, the storage management API may add storage group SG2 420 to a candidate list (235) and determine whether there are more storage groups (240).

Because this was the last storage group found (243), the storage management API then may then pick the best candidate from the candidate list (245). Here, the candidate list includes both SG1 410 having volumes V1 and V2 and SG2 420 having volumes V1, V3, and V4 (350). The storage management API then may determine the commonality between any of the candidate storage groups (355). Here, both SG1 410 and SG2 420 have volume V1 in common with the expected volumes, SG1 410 also has volume V2 in common with the expected volumes, and SG2 420 has both volumes V3 and V4 in common with the expected volumes. Accordingly, the storage management API may choose storage group SG2 420 as a child existing storage group of the parent cascaded storage group (360) because it has more volumes (e.g., volumes V1, V3, and V4) in common with the expected volumes (e.g., volumes V1, V2, V3, and V4) than storage group SG1 410 (e.g., volumes V1 and V2).

As illustrated in FIG. 4B, the storage management API then may create a new child storage group SGC 430 having volume V2 and associate it and the existing child storage group SG2 420 with a parent cascaded storage group 440 having volumes V1, V2, V3, and V4.

Figure 5B:
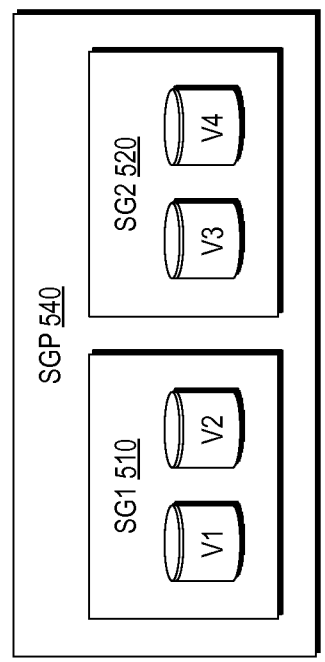
Figure 5A:
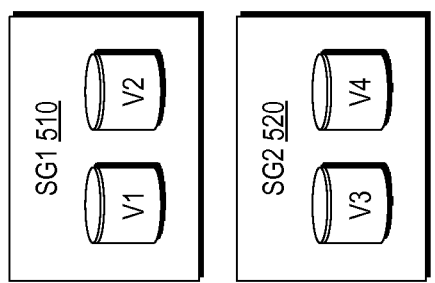

FIGS. 5A and 5B are block diagrams illustrating creation of a parent cascaded storage group having volumes V1, V2, V3, and V4. As illustrated in FIG. 5A, there are two existing storage groups, SG1 510 having volumes V1 and V2 and SG2 520 having volumes V3 and V4. The storage management API may use the method illustrated in the flow diagram of FIG. 2 to determine whether either and which existing storage group (i.e., SG1 510 and/or SG2 520) may be used as a child storage group in creating a cascaded parent storage group.

Accordingly, the storage management API may determine the expected volumes for tiering (e.g., volumes V1, V2, V3, and V4) (205). The storage management API then may get all available storage groups (e.g., SG1 510 and SG2 520) (210). The storage management API the may get all volumes in a storage group (e.g., V1 and V2 in SG1 510) (215) and determine whether the volumes are a subset of the expected volumes (220). In this example, volumes V1 and V2 in SG1 510 are a subset of the expected volumes V1, V2, V3, and V4 (223) and are not an existing cascaded storage group (233). Accordingly, the storage management API may add storage group SG1 510 to a candidate list (235) and determine whether there are more storage groups (240).

The storage management API then may iterate to the next storage group (225) SG2 520 and get all volumes in the storage group (e.g., V3 and V4 in SG2 520) (215). In this example, volumes V3 and V4 in SG2 520 are a subset of the expected volumes V1, V2, V3, and V4 (223) and are not an existing cascaded storage group (233). Accordingly, the storage management API may add storage group SG2 520 to a candidate list (235) and determine whether there are more storage groups (240).

Because this was the last storage group found (243), the storage management API then may then pick the best candidate from the candidate list (245). Here, the candidate list includes both SG1 510 having volumes V1 and V2 and SG2 520 having volumes V3 and V4 (350). The storage management API then may determine the commonality between any of the candidate storage groups (355). Here, both SG1 510 and SG2 520 having two volumes in common with the expected volumes: SG1 510 has volumes V1 and V2 in common with the expected volumes and SG2 520 has volumes V3 and V4 in common with the expected volumes. However, there is no commonality between the candidate storage groups SG1 510 and SG2 520, so the storage management API need not choose which existing storage group to use as a child storage group. Accordingly, the storage management API may choose both storage groups SG1 510 and SG2 520 as existing child storage groups of the parent cascaded storage group (360)).

As illustrated in FIG. 5B, the storage management API then may create a parent cascaded storage group 540 having volumes existing storage group SG1 510 with volumes V1 and V2 and existing storage group SG2 520 with volumes V3 and V4 and child storage groups.

Figure 6B:
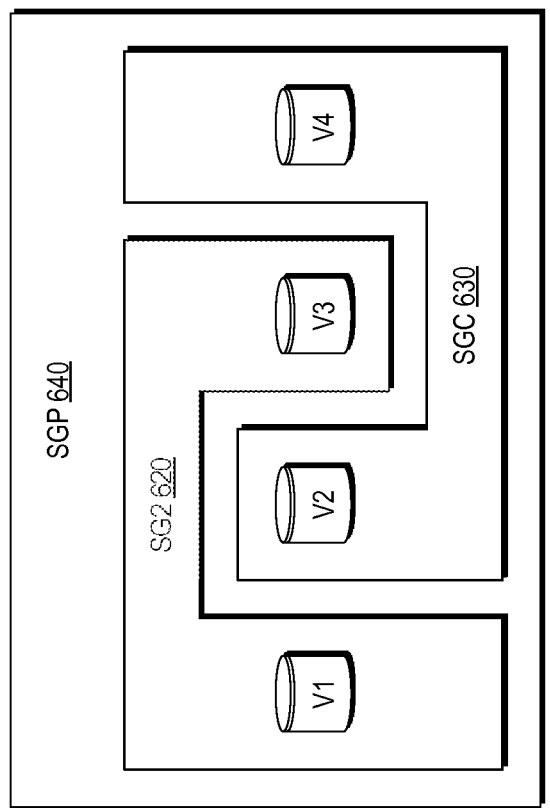
Figure 6A:
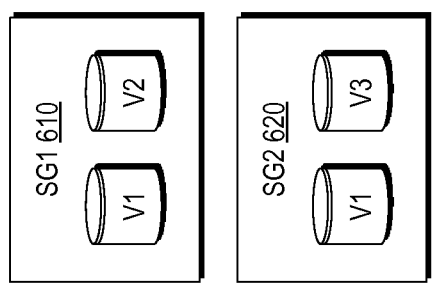

FIGS. 6A and 6B are block diagrams illustrating creation of a parent cascaded storage group having volumes V1, V2, V3, and V4. As illustrated in FIG. 6A, there are two existing storage groups, SG1 610 having volumes V1 and V2 and SG2 620 having volumes V1 and V3. The storage management API may use the method illustrated in the flow diagram of FIG. 2 to determine whether either and which existing storage group (i.e., SG1 610 and/or SG2 620) may be used as a child storage group in creating a cascaded parent storage group.

Accordingly, the storage management API may determine the expected volumes for tiering (e.g., volumes V1, V2, V3, and V4) (205). The storage management API then may get all available storage groups (e.g., SG1 610 and SG2 620) (210). The storage management API may get all volumes in a storage group (e.g., V1 and V2 in SG1 610) (215) and determine whether the volumes are a subset of the expected volumes (220). In this example, volumes V1 and V2 in SG1 610 are a subset of the expected volumes V1, V2, V3, and V4 (223) and are not an existing cascaded storage group (233). Accordingly, the storage management API may add storage group SG1 610 to a candidate list (235) and determine whether there are more storage groups (240).

The storage management API then may iterate to the next storage group (225) SG2 620 and get all volumes in the storage group (e.g., V1 and V3 in SG2 620) (215). In this example, volumes V1 and V3 in SG2 620 are a subset of the expected volumes V1, V2, V3, and V4 (223) and are not an existing cascaded storage group (233). Accordingly, the storage management API may add storage group SG2 620 to a candidate list (235) and determine whether there are more storage groups (240).

Because this was the last storage group found (243), the storage management API then may then pick the best candidate from the candidate list (245). Here, the candidate list includes both SG1 610 having volumes V1 and V2 and SG2 620 having volumes V1 and V3 (350). The storage management API then may determine the commonality between any of the candidate storage groups (355). Here, both SG1 610 and SG2 620 have volume V1 in common with the expected volumes, SG1 610 also has volume V2 in common with the expected volumes, and SG2 620 also has volume V3 in common with the expected volumes. Therefore, both SG1 610 and SG2 620 are equally good candidates for selection as a child storage group of the parent storage group. However, in certain embodiments of the present invention, the storage management API determines that the latter examined storage group (e.g., SG2 620) is equally as good a match as the prior examined storage group (e.g., SG1 610) and removes the prior examined storage group (e.g., SG1 610) from the list of candidates. Accordingly, the storage management API may choose storage group SG2 620 as a child existing storage group of the parent cascaded storage group (360).

As illustrated in FIG. 6B, the storage management API then may create a new child storage group SGC 630 having volumes V2 and V4 and associate it and the existing child storage group SG2 620 with a parent cascaded storage group 640 having volumes V1, V2, V3, and V4.

Figure 7B:
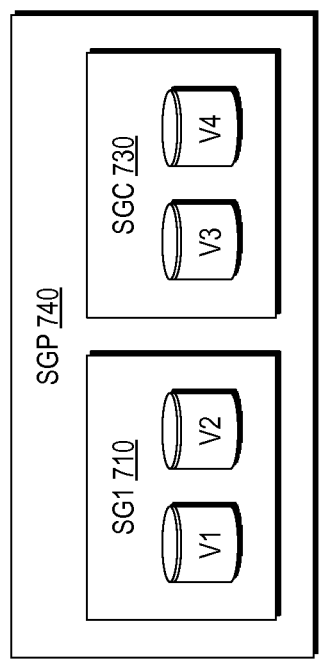
Figure 7A:
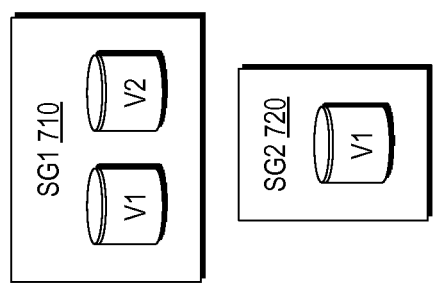

FIGS. 7A and 7B are block diagrams illustrating creation of a parent cascaded storage group having volumes V1, V2, V3, and V4. As illustrated in FIG. 7A, there are two existing storage groups, SG1 710 having volumes V1 and V2 and SG2 720 having volume V1. The storage management API may use the method illustrated in the flow diagram of FIG. 2 to determine whether either and which existing storage group (i.e., SG1 710 and/or SG2 720) may be used as a child storage group in creating a cascaded parent storage group.

Accordingly, the storage management API may determine the expected volumes for tiering (e.g., volumes V1, V2, V3, and V4) (205). The storage management API then may get all available storage groups (e.g., SG1 710 and SG2 720) (210). The storage management API the may get all volumes in a storage group (e.g., V1 and V2 in SG1 710) (215) and determine whether the volumes are a subset of the expected volumes (220). In this example, volumes V1 and V2 in SG1 710 are a subset of the expected volumes V1, V2, V3, and V4 (223) and are not an existing cascaded storage group (233). Accordingly, the storage management API may add storage group SG1 710 to a candidate list (235) and determine whether there are more storage groups (240).

The storage management API then may iterate to the next storage group (225) SG2 720 and get all volumes in the storage group (e.g., V1 in SG2 720) (215). In this example, volume V1 in SG2 720 is a subset of the expected volumes V1, V2, V3, and V4 (223) and is not an existing cascaded storage group (233). Accordingly, the storage management API may add storage group SG2 720 to a candidate list (235) and determine whether there are more storage groups (240).

Because this was the last storage group found (243), the storage management API then may then pick the best candidate from the candidate list (245). Here, the candidate list includes both SG1 710 having volumes V1 and V2 and SG2 720 having volume V1 (350). The storage management API then may determine the commonality between any of the candidate storage groups (355). Here, both SG1 710 and SG2 720 have volume V1 in common with the expected volumes, SG1 710 also has volume V2 in common with the expected volumes, and SG2 720 has no other volumes in common with the expected volumes. Accordingly, the storage management API may choose storage group SG1 710 as a child existing storage group of the parent cascaded storage group (360) because it has more volumes (e.g., volumes V1 and V2) in common with the expected volumes (e.g., volumes V1, V2, V3, and V4) than storage group SG2 720 (e.g., volume V1).

As illustrated in FIG. 7B, the storage management API then may create a new child storage group SGC 730 having volumes V3 and V4 and associate it and the existing child storage group SG1 710 with a parent cascaded storage group 740 having volumes V1, V2, V3, and V4.

Figure 8:
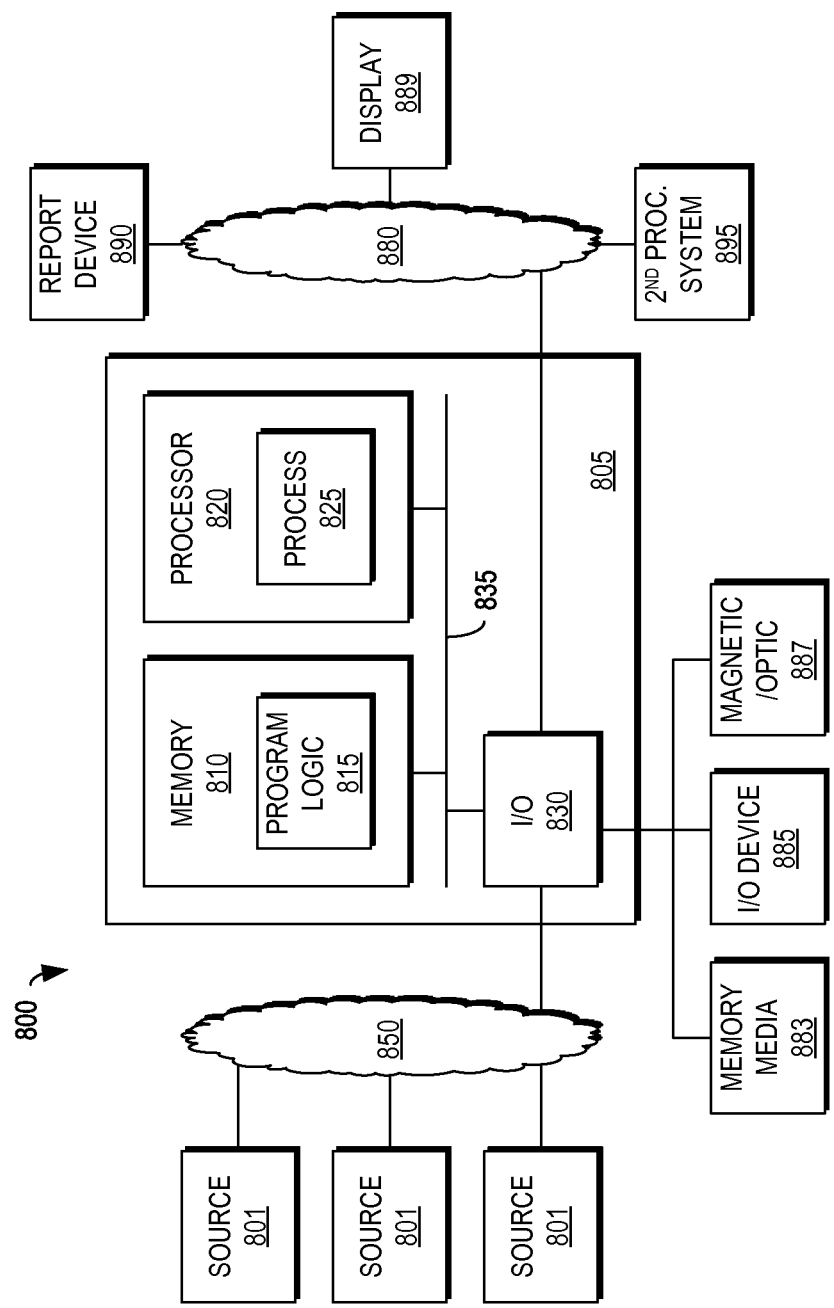
FIG. 8 is a block diagram of an apparatus according to an example embodiment of the present invention.

FIG. 8 is a block diagram of a computer program product 800 including program logic 855, encoded on a computer-readable medium 860 in computer-executable code configured for carrying out the methods of the invention, according to an example embodiment of the present invention. The logic for carrying out the method may be embodied as part of the aforementioned system, which is useful for carrying out a method described with reference to embodiments shown.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 8, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 9:
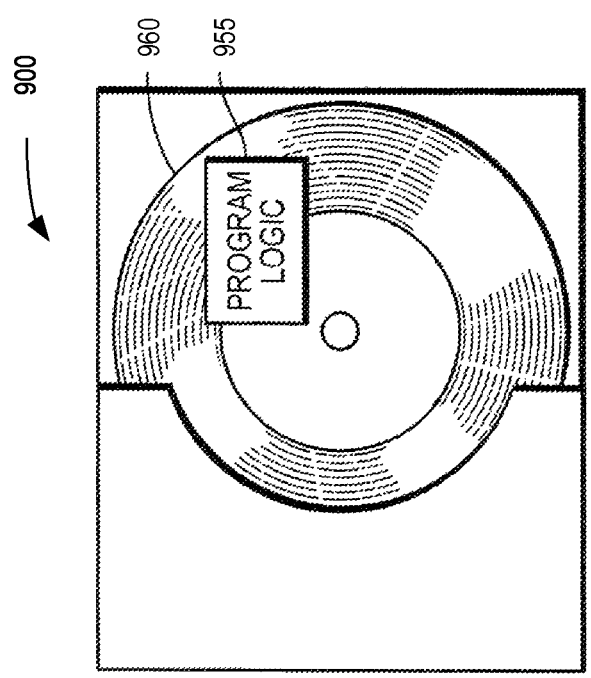
FIG. 9 is a block diagram of a computer program product including program logic, encoded on a computer-readable medium in computer-executable code configured for carrying out the methods of the invention, according to an example embodiment of the present invention.

FIG. 9 is a block diagram of a computer program product 900 including program logic 955, encoded on a computer-readable medium 960 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method, comprising:
receiving a request to apply a first data storage tiering policy to a first group of volumes;
iterating through all available storage groups in a first storage array, each respective storage group comprising a respective plurality of volumes, to determine whether any volumes in the respective storage group satisfy a first condition of being both common to the first group of volumes and not being associated with an existing cascaded storage group;
defining, if there are volumes in a respective storage group that satisfy the first condition, a respective candidate list of those volumes in the respective storage group that satisfy the first condition;
analyzing, when the iterating is complete, all of a plurality of respective candidate lists, to determine if any respective candidate list satisfies a second condition;
selecting, if a respective candidate list satisfies the second condition, the volumes associated with the respective candidate list that satisfies the second condition to be a first child storage group to a first parent cascaded storage group; and
selecting, if the first and second respective candidate lists both satisfy the second condition, whichever of the first and second candidate lists was iterated through the most recently to be the first child storage group to the first parent cascaded storage group.

2. The method of claim 1, further comprising applying the first data storage tiering policy to the first child storage group and to the first parent cascaded storage group.

3. The method of claim 1, further comprising:
applying the first data storage tiering policy to the first child storage group; and
applying a second data storage tiering policy to the first parent cascaded storage group.

4. The method of claim 1, further comprising:
comparing the first child storage group to the first group of volumes to determine a set of missing volumes, the set of missing volumes comprising at least one volume from the first group of volumes that is not part of the first child storage group; and
creating a second child storage group to the first parent cascaded storage group, the second child storage group comprising the set of missing volumes.

5. The method of claim 1, wherein the first storage array is part of a virtual storage tier in a cloud environment.

6. The method of claim 1, wherein the second condition comprises the respective candidate list having more volumes in common with the first group of volumes than any other candidate list in the plurality of respective candidate storage lists.

7. The method of claim 1, wherein, if first and second respective candidate lists both satisfy the second condition, then the method further comprises selecting both the first and second candidate lists to be respective first and second child storage groups to the first parent cascaded storage group, if the volumes associated with the first candidate list are different from the volumes associated with the second candidate list.

8. The method of claim 1, further comprising removing the unselected candidate list from the plurality of respective candidate lists.

9. The method of claim 1, wherein the first data storage tiering policy comprises a Fully Automated Storage Tiering (FAST) policy.

10. A system, comprising:
a storage array storing a plurality of storage groups, each storage group comprising a respective plurality of volumes; and
computer executable logic configured to enable one or more processors of the system to perform operations of:
receiving a request to apply a first data storage tiering policy to a first group of volumes;

iterating through all available storage groups in a first storage array, each respective storage group comprising a respective plurality of volumes, to determine whether any volumes in the respective storage group satisfy a first condition of being both common to the first group of volumes and not being associated with an existing cascaded storage group;

defining, if there are volumes in a respective storage group that satisfy the first condition, a respective candidate list of those volumes in the respective storage group that satisfy the first condition;

analyzing, when the iterating is complete, all of a plurality of respective candidate lists, to determine which respective candidate list satisfies a second condition;

selecting, if a respective candidate list satisfies the second condition, the volumes associated with the respective candidate list that satisfies the second condition to be a first child storage group to a first parent cascaded storage group; and selecting, if the first and second respective candidate lists both satisfy the second condition, whichever of the first and second candidate lists was iterated through the most recently to be the first child storage group to the first parent cascaded storage group.

11. The system of claim 10, wherein the one or more processors are further configured to perform the operation of applying the first data storage tiering policy to the first child storage group and to the first parent cascaded storage group.

12. The system of claim 10, wherein the one or more processors are further configured to perform the operations of:
applying the first data storage tiering policy to the first child storage group; and
applying a second data storage tiering policy to the first parent cascaded storage group.

13. The system of claim 10, wherein the one or more processors are further configured to perform the operations of:
comparing the first child storage group to the first group of volumes to determine a set of missing volumes, the set of missing volumes comprising at least one volume from the first group of volumes that is not part of the first child storage group; and
creating a second child storage group to the first parent cascaded storage group, the second child storage group comprising the set of missing volumes.

14. The system of claim 10 wherein the first storage array is part of a virtual storage tier in a cloud environment.

15. The system of claim 10, wherein the second condition comprises the respective candidate list having more volumes in common with the first group of volumes than any other candidate list in the plurality of respective candidate storage lists.

16. The system of claim 10, wherein, if first and second respective candidate lists both satisfy the second condition, then the one or more processors are further configured to perform the operation of selecting both the first and second candidate lists to be respective first and second child storage groups to the first parent cascaded storage group, if the volumes associated with the first candidate list are different from the volumes associated with the second candidate list.

17. The system of claim 10, wherein the one or more processors are further configured to perform the operation of removing the unselected candidate list from the plurality of respective candidate lists.

18. The system of claim 10, wherein the first data storage tiering policy comprises a Fully Automated Storage Tiering (FAST) policy.

19. A computer program product including a non-transitory computer readable storage medium have computer program code encoded thereon that, when executed on one or more processors of a system, causes the system to manage a plurality of storage providers to create a cascaded storage group, the computer program code comprising:
computer program code for receiving a request to apply a first data storage tiering policy to a first group of volumes;
computer program code for iterating through all available storage groups in a first storage array, each respective storage group comprising a respective plurality of volumes, to determine whether any volumes in the respective storage group satisfy a first condition of being both common to the first group of volumes and not being associated with an existing cascaded storage group;
computer program code for defining, if there are volumes in a respective storage group that satisfy the first condition, a respective candidate list of those volumes in the respective storage group that satisfy the first condition;
computer program code for analyzing, when the iterating is complete, all of a plurality of respective candidate lists, to determine which respective candidate list satisfies a second condition;
computer program code for selecting, if a respective candidate list satisfies the second condition, the volumes associated with the respective candidate list that satisfies the second condition to be a first child storage group of a first parent cascaded storage group; and
computer program code for selecting, if the first and second respective candidate lists both satisfy the second condition, whichever of the first and second candidate lists was iterated through the most recently to be the first child storage group to the first parent cascaded storage group.

20. The computer program product of claim 19, wherein the second condition comprises the respective candidate list having more volumes in common with the first group of volumes than any other candidate list in the plurality of respective candidate storage lists.

21. The computer program product of claim 19, wherein if the first and second respective candidate lists both satisfy the second condition, then the computer program product further comprises computer program code for selecting both the first and second candidate lists to be respective first and second child storage groups to the first parent cascaded storage group, if the volumes associated with the first candidate list are different from the volumes associated with the second candidate list.

22. The computer program product of claim 19, further comprising:
computer program code for comparing the first child storage group to the first group of volumes to determine a set of missing volumes, the set of missing volumes comprising at least one volume from the first group of volumes that is not part of the first child storage group; and
computer program code for creating a second child storage group to the first parent cascaded storage group, the second child storage group comprising the set of missing volumes.

* * * * *